United States Patent
Shalvi

(10) Patent No.: US 7,380,193 B1
(45) Date of Patent: May 27, 2008

(54) JOINTLY CODED COOPERATIVE NETWORKING

(76) Inventor: Ofir Shalvi, Tabenkin 19, Herzlia (IL)

( * ) Notice: Subject to any disclaimer, the term of this patent is extended or adjusted under 35 U.S.C. 154(b) by 485 days.

(21) Appl. No.: 11/019,087

(22) Filed: Dec. 21, 2004

Related U.S. Application Data

(63) Continuation-in-part of application No. 10/943,155, filed on Sep. 15, 2004, now abandoned.

(60) Provisional application No. 60/502,918, filed on Sep. 16, 2003.

(51) Int. Cl.
*G06F 11/00* (2006.01)
(52) U.S. Cl. .................................... 714/746
(58) Field of Classification Search ............... 714/752, 714/746
See application file for complete search history.

(56) References Cited

U.S. PATENT DOCUMENTS 6,144,654 A * 11/2000 Ibanez-Meier et al. ..... 370/342
6,961,388 B2 * 11/2005 Ling et al. .................. 375/267

* cited by examiner

*Primary Examiner*—Shelly A Chase
(74) *Attorney, Agent, or Firm*—Swernofsky Law Group PC

(57) ABSTRACT

Jointly encoding signals from multiple sources, by cooperating stations, with retransmission of those jointly encoded signals to receivers. A cooperating station decodes signals from multiple sources, jointly encodes them to form a joint protection signal responsive to the decoded signals from those multiple sources, simultaneously responsive to more than one of them. The cooperating station sends the protection signal to one or more receivers, which use that joint protection signal to decode those signals from multiple sources. More than one cooperating stations can each perform similar tasks. Each of those cooperating stations performs those tasks using a distinct protection code, such as a similar error-correcting code, but with distinct parameters. The cooperative stations use an error-correcting block code, including decoding data and parity values of the multiple signals; computing the error-correcting block code; and sending a differing portion of the computed block code.

19 Claims, 6 Drawing Sheets

JOINTLY CODED COOPERATIVE NETWORKING

BACKGROUND OF THE INVENTION

1. Field of the Invention

The invention relates to coded cooperative networking; in an aspect of the invention, not intended to be limiting in any way, signals from multiple wireless sources are jointly coded and decoded using multiple wireless receivers, with the effect of improved robustness to channel fades and reduced penalty in bandwidth utilization.

2. Related Art

In communication systems, one known problem is that receivers sometimes receive distorted versions of signals sent by senders. In wireless communication, this can occur because of fading, that is, substantial reduction in the received strength or SNR (signal to noise ratio) of the incoming signal or a portion of its frequencies.

One known solution to fading is called "diversity," in which the same data is sent using separate times, separate frequencies, or separate antennas. While this known solution reduces the effect of fading, it comes with a price: additional bandwidth use that might otherwise have been used for communication capacity. Moreover, in many wireless systems these diversity approaches are relatively inefficient, such as in the event that the maximum delay and bandwidth allowed by the system are relatively small, compared to restrictions imposed by the fading process coherence time and bandwidth.

A second known solution is called "cooperative diversity," in which transmission from a sender to its receivers is received, decoded, and retransmitted by more than one intermediate relay station; with the effect that fading from the sender to its receivers is at least partially overcome. While this known solution further reduces the effect of fading, it still comes with the same price: additional bandwidth use that might otherwise have been used for communication capacity.

Another known technique, used in switching networks, sometimes called "network coding", is performed in a switching network in which a digital message packet might be sent along multiple pathways from a source to a destination. While this technique improves the reliability of communication, it involves a switching network and not a broadcast network, it involves digital data and not analog signal information, and it involves multiple deliveries of the same data and no joint protective code.

Accordingly, it would be advantageous to provide coding and decoding techniques, methods and systems, not subject to drawbacks of the known art.

SUMMARY OF THE INVENTION

The invention provides techniques, embodied in methods and systems, regarding encoding signals, decoding signals, and adapting parameters for encoding or decoding signals, in a system having multiple source channels. Encoding might be performed for example by one or more cooperating stations, with retransmission of those jointly encoded signals to one or more receivers. This has the effect of providing reception that is resistant to degradation of multiple signals by jointly encoding those signals. For example, even if a single sender uses multiple media (such as for example encodings, frequencies, time slots, and the like) for sending distinct signals, where those multiple media are subject to distinct fading effects, those multiple signals might still be jointly encoded by one or more cooperating stations, with the effect of improving a communication network including that sender and a receiver.

Encoding Methods

In a first aspect, new encoding methods include decoding signals from multiple source channels, jointly encoding them to form a joint protection signal responsive to the decoded signals from those multiple source channels, that is, simultaneously responsive to more than one of them. The joint protection signal is sent to one or more receivers, which are capable of using that joint protection signal to decode those signals from multiple source channels. The joint protection signal might include an error-correcting code, or other information suitable for the receivers to use to decode those signals from those multiple source channels.

These encoding methods might be performed as follows.

By multiple source channels operating cooperatively, with the effect that each source channel can compute the joint protection signal in joint response to (1) its own data to be sent, and (2) data from a second source channel. In the event the second source channel is degraded by transmission media or other effects, these encoding methods include decoding signals from the second source channel to obtain data to be used.

By at least one cooperating station, possibly separate from the source channels. Those at least one cooperating stations decode signals from multiple source channels, compute a joint protective signal, and send that joint protective signal to one or more receivers.

By multiple such cooperating stations, possibly separate from the source channels. Those multiple cooperating stations each separately decode signals from multiple source channels, each separately compute a joint protective signal, and each separately send its joint protective signal to one or more receivers. Those multiple cooperating stations might each compute a similar joint protective signal, or different joint protective signals (such as for example similar error-correcting codes, but with distinct parameters, or different error-correcting codes entirely).

By multiple such cooperating stations each having allotted a portion of a channel, with the effect that data signals are interleaved with joint protective signals. These encoding methods might be performed by multiple such cooperating stations each having allotted a portion of a channel and each listening to other cooperating stations for earlier joint protective signals, with the effect that each succeeding joint protective signals is progressively dependent on more data signals.

By source channels or cooperating stations using joint protective signals other than block codes (that is, for example, parity bits, Hamming codes, or Reed-Solomon codes). For a first example, each source channel or cooperating station might have a separate state value with which it encodes data to be sent, that separate state value being alterable in response to signals it decodes.

By source channels using turbo-codes (that is, in which when sending, one or more of the source channels interleaves its data with its own protection code).

Using adaptive techniques, such as for example in which the joint protective signal relies relatively more or relatively less on selected source channels, in response to a perceived quality of a signal from those selected source channels.

In various embodiments, these encoding methods might be performed in conjunction or cooperation, such as for example by both (1) source channels combining their data with data decoded from other source channels, and (2) cooperating stations decoding signals received from those source channels and computing separate joint protective signals. For example, one channel might be a wireless channel, while a second channel is a wire-line channel or a channel using a distinct communication technique. After reading this application, other and further possible combinations would be clear to those skilled in the art.

In other and further embodiments, these encoding methods might also be performed in response to only selected portions of received data signals. These include the possibilities of (1) declining to generate a joint protective signal for data that includes information deemed sufficiently unreliable, (2) generating a joint protective signal only for that portion of the data deemed sufficiently reliable, (3) sending an auxiliary signal, possibly interspersed or overlaid on the main signal, indicating what portions of the data were deemed sufficiently reliable or unreliable. In such embodiments, the signal is preferably determined to be sufficiently reliable or unreliable in response to its SNR (signal to noise ratio), in response to its BER (bit error rate) measured by an internal protective code, such as for example a CRC (cyclic redundancy code).

Decoding Methods

In a second aspect, decoding methods used with the encoding methods described above are also new with regard to known diversity coding techniques. This has the effect that methods and systems using known diversity coding techniques are new when combined with the decoding methods described herein.

These decoding methods might be performed as follows.

Decoding signals at one or more receivers, where those signals were received from both at least one source channel and at least one cooperating diversity encoding station. This would include any technique for decoding using a joint protection code.

Decoding signals at one or more receivers, where those signals are weighted according to their perceived quality. More particularly, receivers can select portions of the signals they receive, in response to (1) a better signal, as described above, (2) a combination of signals, such as for example a weighted average, (3) a combination where the weighted average is zero, that is, signals are erased if their quality is below a threshold, possibly an adaptive threshold.

Decoding signals at one or more receivers, by determining perceived fading effects from the source channel or of the cooperating stations, and attempting to invert those perceived fading effects.

Network Configuration

The encoding and decoding methods described below might be enhanced by adaptively optimizing parameters of those selected methods, in response to (1) perceived fading effects from the source channel or of the cooperating stations, and other channel parameters, such as for example SNR values or statistical parameters, or (2) parameters responsive to capabilities of cooperating stations, such as for example power supply, computational and memory resources.

After reading this application, those skilled in the art would recognize that the invention provides an enabling technology by which substantial advance is made in the art of communication.

After reading this application, these and other and further uses of the invention would be clear to those skilled in the art.

INCORPORATED DISCLOSURE

Figure 1:
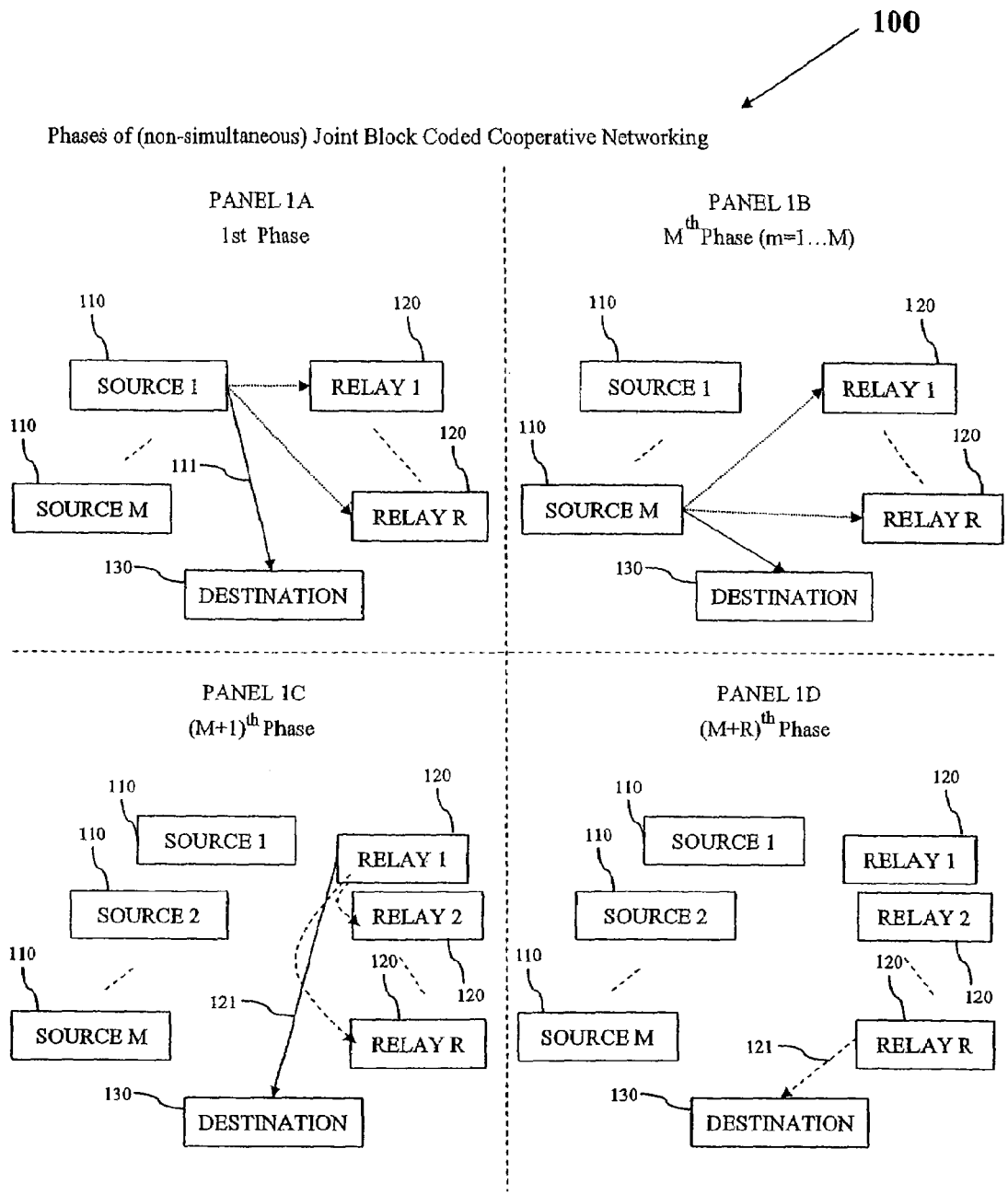
FIG. 1 (collectively including panels 1A, 1B, 1C, and 1D) shows a system including the use of Joint Cooperative Coding.

This application incorporates by reference and claims priority of at least the following documents.

U.S. Provisional Patent Application No. 60/502,918, filed Sep. 16, 2003, in the name of the same inventor, titled "Jointly Coded Cooperative Networking".

U.S. patent application Ser. No. 10/943,155, filed Sep. 15, 2004 in the name of the same inventor, titled "Jointly Coded Cooperative Networking".

These documents are hereby incorporated by reference as if fully set forth herein, and are sometimes referred to herein as the "incorporated disclosure". Inventions described herein can be used in combination or conjunction with technology described in the incorporated disclosure.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

DEFINITIONS

The term "channel," and the like, refers to any technique by which a signal might be separately sent (such as for example using CDMA for a first channel, FDMA for a second channel, and TDMA for a third channel), and the like.

The term "network," and the like, refers to any system including two or more stations capable of sending data from at least one sending station to at least one receiving station. In various embodiments, the data might include digitized audio signals (such as for example music or speech), digitized video signals (whether or not synchronized with audio), and the like.

The phrase "wireless network," and the like, refers to any network in which at least some of the data is sent without a wire line coupling, including without limitation radio signals (such as for example acoustic signals, microwave signals, optical signals), and the like).

EXEMPLARY ENVIRONMENTS

In the exemplary embodiments described herein, the wireless network is described as a TDMA (time division multiple access) network with a single destination/receiver station, and M source channels. Each source channel sends packets with a consistent packet size of L bytes each, and with equal packet rates.

Notwithstanding this exemplary description, after reading this application, those skilled in the art would recognize that the invention has wide applicability to other signal channels, including CDMA (code division), FDMA (frequency division), and other techniques. In the context of the invention, there is no particular requirement to limit the possible embodiments to those described herein.

Similarly, in the exemplary embodiments described herein, channel fading is assumed to be flat, Raleigh distributed, and quasi-stationary (that is, fading is substantially constant throughout a single packet), that noise is AWGN (additive white Gaussian noise), and that both fading and noise are statistically independent among different stations.

Again, notwithstanding this exemplary description, after reading this application, those skilled in the art would recognize that the invention has wide applicability to other signal channels, such as for example: fast fading, Ricean fading, selective fading, non-Gaussian noise, and the like.

Joint Cooperative Coding

FIG. 1 (collectively including panels 1A, 1B, 1C, and 1D) shows a system including the use of Joint Cooperative Coding.

A system 100 includes elements as shown in FIG. 1, plus possibly other elements as described in the incorporated disclosure. These elements include at least a set of M source channels 110, a set of R cooperative stations 120 (herein sometimes called "relay" stations), and at least one destination station 130 (herein sometimes called the "receiver").

As described above, a source channel 110 includes elements as shown in FIG. 1, plus possibly other elements as described in the incorporated disclosure. The source channel 110 is typically an independent sending station, but might be a separate channel with distinct fading characteristics at a substantially single location.

Similarly, each of the R cooperating stations 120 includes elements as shown in FIG. 1, plus possibly other elements as described in the incorporated disclosure. Each of the R cooperating stations 120 is typically a station at a substantially independent location (and is not a source channel 110), but more than one of those R cooperative stations 120 might be combined in the event there is a substantial difference in fading characteristics for distinct source channels. In some embodiments, as described herein, one or more of those R cooperative stations 120 might also take on the role of a source channel 110.

Similarly, the destination station 130 includes elements as shown in FIG. 1, plus possibly other elements as described in the incorporated disclosure. The destination station 130 is capable of receiving information signals and protection signals from the source channels 110 and from the cooperating stations 120. The destination station 130 is typically a station at a substantially independent location (and is neither a source channel 110 nor a cooperating station 110), but one or more destination stations 130 might also take on the role of a source channel 110, or of a cooperating station 120.

After reading this application, those skilled in the art will recognize that it is possible for each device (source channel 110, cooperating station 120, destination station 130) to potentially takes on each possible role, in response to an intended direction of travel for a message.

A panel 1A shows a first phase of operation (which in a TDMA system would occur during a first time slot in a frame), in which a first one of the source channels 110 broadcasts an information signal 111, intending to be received by the destination station 130. This has the effect that each of the R cooperative stations 120 also receives that information signal 111. Each of the R cooperative stations 120, and the destination station 130, receives the information signal 111, each with some degree of fading and noise. It is probable that the relative degrees of fading or noise will be substantially different for each of the R cooperative stations 120 and for the destination station 130.

A panel 1B shows an $m^{th}$ phase of operation (which in a TDMA system would occur during an $m^{th}$ time slot in a frame), in which an $m^{th}$ one of the source channels 110 broadcasts an information signal 111, intending to be received by the destination station 130. As in the panel 1A, this has the effect that each of the R cooperative stations 120 also receives that information signal 111. This phase of operation is also otherwise similar to that described with respect to the panel 1A. After each of the M source channels 110 have each had the opportunity to conduct their broadcast (either as shown in the panel 1A or the panel 1B), this has the effect that all M source channels 110 have sent their information signals to the destination station 130.

A panel 1C shows an $(M+1)^{st}$ phase of operation (which in a TDMA system would occur during an $(M+1)^{st}$ time slot in a frame), in which a first one of the R cooperative stations 120 sends the joint protective code 121 it computed, responsive to at least two of the M source channels 110. As in the panel 1A, this has the effect that each of the other (R−1) cooperative stations 120, and the destination station 130, also receives that joint protective code 121.

A panel 1D shows an $(M+R)^{th}$ phase of operation (which in a TDMA system would occur during an $(M+R)^{th}$ time slot in a frame), in which an $R^{th}$ one of the R cooperative stations 120 sends the joint protective code 121 it computed, responsive to at least two signals already sent during this TDMA frame. As in the panel 1A, this has the effect that each of the other (R−1) cooperative stations 120, and the destination station, also receives that joint protective code 121.

In one embodiment, the joint protective code 121 includes a Reed-Solomon code over GF(256) with a selected number k parity bytes. During the $(M+1)^{st}$ phase of operation through the $(M+R)^{th}$ phase of operation, the parity symbols for the block-code are sent, along with signal indicators of the perceived reliability of each of the M information signals 111.

After reading this application, those skilled in the art will recognize that in this exemplary embodiment, there is time for each of the R cooperating stations 120 to determine its own joint protective code 121, either in response to only source channels 110, in response to both source channels 110 and earlier cooperating stations 120, or even in response to only earlier cooperating stations 120.

Relay Operation

Figure 2:
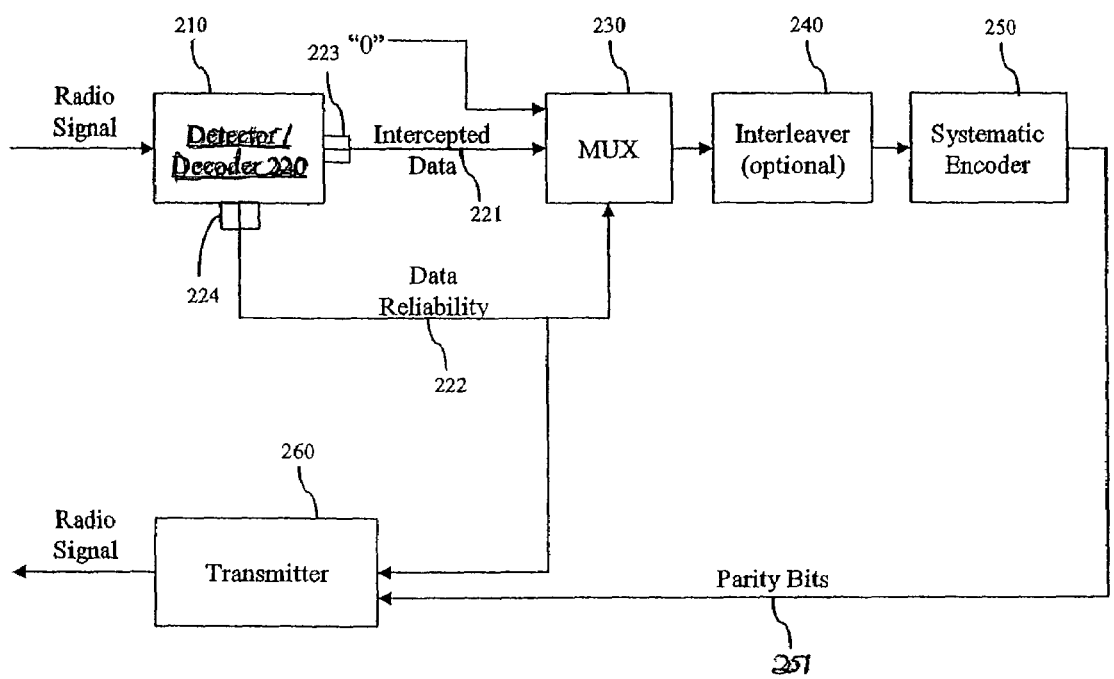
FIG. 2 shows a block diagram of a relay in a cooperating station in a system including the use of Joint Cooperative Coding.

FIG. 2 shows a block diagram of a relay in a cooperating station in a system including the use of Joint Cooperative Coding.

A relay 200 includes elements as shown in FIG. 2, plus possibly other elements as described in the incorporated disclosure. These elements include at least an input port 210 disposed to receive a radio signal (such as for example, coupled to a receiving antenna), a detector/decoder 220, a decoded data bus 221 and a reliability signal bus 222 coupled to the detector/decoder 220, a multiplexer 230, an (optional) interleaf circuit 240, a sending encoder 250, an encoded protection signal bus 251 coupled to an output of the sending encoder 250, and an output port 260 disposed to send a radio signal (such as for example, coupled to a sending antenna).

The detector/decoder 220 is coupled to the input port 210, and includes elements as shown in FIG. 2, plus possibly other elements as described in the incorporated disclosure. These elements include at least a data detection circuit 223, disposed for determining the "best" value the relay 200 can determine for any particular data bit as it arrives, and at least a data reliability circuit 224, disposed for determining a measure of reliability of that data bit. In various embodiments, the data reliability circuit 222 might (a) examine a power level of the received signal, (b) estimate the SNR of the received signal, or (c) estimate a BER of the received signal.

The decoded data bus 221 is coupled to the data detection circuit 223 and the multiplexer 230, as shown in FIG. 2, plus possibly other circuits as described in the incorporated disclosure.

The reliability signal bus 222 is coupled to the data reliability circuit 224, to the multiplexer 230, and to the output port 260, as shown in FIG. 2, plus possibly other circuits as described in the incorporated disclosure. If the cooperating station 120 is itself a source channel 110, the reliability signal bus 222 is pre-set to indicate that the signal is "sufficiently reliable", as that signal is determined at the source channel 110 itself.

The multiplexer 230 has a first data input 231 coupled to a logical "o" bit, a second data input 232 coupled to the decoded data bus 221, and a control input 233 coupled to the reliability signal bus 222. This has the effect that the multiplexer 230 will pass through any received data bits perceived as sufficiently reliable, while erasing (replacing with logical "o") any received data bits perceived as insufficiently reliable.

The (optional) interleaf circuit 240 is coupled to an output of the multiplexer 230, as shown in FIG. 2, plus possibly other circuits as described in the incorporated disclosure. In optional embodiments, the interleaf circuit 240 causes data (data to be sent) and parity (computed Reed-Solomon code symbols) to be interleaved for use in a TDMA system. In alternative embodiments not including the interleaf circuit 240, the sending encoder 250 is coupled directly to that output of the multiplexer 230.

In embodiments including the interleaf circuit 240, the sending encoder 250 is coupled to an output of the interleaf circuit 240, as shown in FIG. 2, plus possibly other circuits as described in the incorporated disclosure. The sending encoder determines an encoded protection signal for output.

The encoded protection signal bus 251 is coupled to the output port 260, as shown in FIG. 2, plus possibly other circuits as described in the incorporated disclosure. The output port 260 is also coupled to the reliability signal bus 222 and receives an indicator whether the received data bits, from which the encoded protection signal was computed, were perceived as sufficiently reliable.

If reliable, the output port 260 sends a signal representative of the encoded protection signal, as delivered to it on the encoded protection signal bus 251. If not reliable, the output port 260 sends a signal with some of the data blocks or protection code blocks erased, that is, set to logical "o".

Examples of Operation (I)

In a first example, there are M source channels 110 and a single cooperating station 120. As described above, in a TDMA system, the cooperating station 120 receives signals that are broadcast by the M source channels 110 in turn, computes a joint protection code in response to the signals from all of those M source channels 110, and sends that joint protection code to the destination station 130.

In this example, the joint protection code includes a sequence of parity bits, in which the $k^{th}$ bit is the XOR of the $k^{th}$ data bits of each of the signals broadcast by the M source stations, for those $k^{th}$ data bits perceived by the cooperating station 120 to be reliable. That is, the $k^{th}$ bit of the joint protection code is an XOR of M separate bits when all source channels 110 are deemed reliable, and (M-u) bits when (u) source channels 110 are deemed unreliable. In this example, a particular source channel 110 is deemed unreliable when its SNR value is below a selected threshold T.

In this example, the cooperating station 120 also sends M auxiliary bits, each indicating whether its corresponding one of the M source channels 110 was excluded from the XOR computation. These M auxiliary bits might be added to each parity frame, or if channel variations are slow enough, once every few parity frames.

A first detection method includes the following steps.
The destination station 130 identifies the source channel 110 with the worst SNR among the collection of M source channels 110 and the cooperating station 120.
If the data bit from that source channel 110 was included in the parity information from the cooperating station 120, the destination station 130 inverts the data bit from that source channel 110 for which there is a parity error. This has the effect that the destination station 130 can recover any single fading event.

A second detection method attempts to determine, at the destination station 110, the incoming data bit with the maximum likelihood of being erroneous. This second detection method includes the following steps.
The destination station 130 determines the maximum-likelihood detection criterion as follows:

$$P_{max} = \max_d P(y_1, \ldots y_M, z | d)$$

where
$d = (d_1, \ldots d_M)$, $d_n$ is the data bit transmitted by the $n^{th}$ channel source 110, $y_n$ is the input received at the destination station 130 corresponding to $d_n$, and z is the parity bit received at the destination station 130 from the cooperating station
This has the effect that the destination station 130 can maximize $P_{max}$ by examining only two cases. One case is $$d_n = \Sigma_{n=1} \ldots M \text{ sign } (y_n)$$

and the other case is
the "least reliable bit", determined as the incoming bit with the lowest signal gain from its source channel 110 (or cooperating station 120) to the destination station 130.
A third detection method includes the following steps.
The destination station 130 decodes the incoming signals from the channel sources 110 and the cooperating station 120.
The destination station 130 identifies the (M−1) "most reliable" received signals at periodic times, where the reliability of a received signal is proportional to the signal gain from its source channel 110 (or cooperating station 120) to the destination station 130.

The destination station 130 modifies its received parity information to remove the effects of the (M−1) "most reliable" received signals identified in the earlier step.

The destination station 130 determines a separate set of parity information for the (M−1) "most reliable" received signals identified in the earlier steps, and computes a second set of parity information for incoming data bits, that second set of parity information not including any of the data bits corresponding to the separate set of parity information for the (M−1) "most reliable" received signals identified in the earlier steps.

The destination station 130 determines a "least reliable" signal in response to the second set of parity information and the relative signal gains for each input signal.

A portion of the technical appendix includes "Matlab" code showing other and further detail with respect to these decoding methods.

Examples of Operation (II)

In a second example, there are M source channels 110 and R cooperating stations 120. For exemplary purposes, in this example R=3, but in the context of the invention, there is no particular requirement for R to take on a specific value. After reading this application, it would be clear to those skilled in the art that R could be any one or more cooperating stations 120.

For exemplary purposes, in this example, each of the R cooperating stations 120 decodes incoming signals from the M source channels 110, and buffers a result of decoding (a set of L bytes from each of the M source channels 110, that is, 8LM bits) in a matrix interleaf circuit 240 like that described with respect to FIG. 2. At each of the R cooperating stations 120, logical "o" bits are inserted in place of any signals deemed lost or insufficiently reliable.

The R cooperating stations 120 each perform the following steps.

The cooperating station 120 computes a first set of 8L bit parities, one for each column of the interleaf circuit 240.

The cooperating station 120 computes a second set of 8L bit parities, one for each diagonal of the interleaf circuit 240. The $l^{th}$ diagonal (out of L diagonals) includes those elements with a line index m=1 . . . M, and whose column index is (m+1) mod L.

The cooperating station 120 computes a second set of 8L bit parities, one for each anti-diagonal of the interleaf circuit 240. The $l^{th}$ anti-diagonal (out of L anti-diagonals) includes those elements with a line index m=1 . . . M, and whose column index is (1−m) mod L.

Examples of Operation (III)

In a third example, a network includes N stations, each of which can take on the role of being a source channel 110, a cooperating station 120, or a destination station 130. This has the effect that for any one source channel 110 and corresponding one destination station 130, there should be (N−2) cooperating stations 120.

For exemplary purposes, in this example, each of the cooperating stations 120 uses a Reed-Solomon code. This example of operation includes the following steps.

There are 2N phases of operation.

In the first N phases, each station sends $L_1$ bytes of information to the destination station 130. That is, each station takes on the role of a source channel 110 for these steps.

Each station receives these N signals and applies a Reed-Solomon encoder to the decoded data. The Reed-Solomon encoder has (N-$L_I$) data bytes and (N-$L_P$) parity bytes. That is, each station takes on the role of a cooperating station 120 for these steps.

In the latter N phases, during each $(N+k)^{th}$ phase, the $k^{th}$ station sends the $k^{th}$ section of the $L_P$ parity bytes of the Reed-Solomon code.

In computing the Reed-Solomon code, each station excludes information bytes deemed insufficiently reliable (such as for example, with an SNR value lower than a selected threshold). Each station also sends (N−1) auxiliary bits indicating which information bytes were excluded.

In alternative embodiments, in the latter N phases, the $k^{th}$ station sends a section of an entire Reed-Solomon code, computed in response to all of the earlier phases.

In the event that some information is "erased" (that is, replaced with logical "o") in response to being deemed insufficiently reliable, the destination station 130 can still recover that erased data. Moreover, recovery of that erased data can use, at least in part, standard components for decoding Reed-Solomon codes. This example of decoding operation includes the following steps.

In the event that data from the $n^{th}$ station was excluded from the parity computation made by the $m^{th}$ station (that is, the signal from the $n^{th}$ station was not sufficiently reliable upon arrival at the $m^{th}$ station), while that data from the $n^{th}$ station was reliably received at the destination station 130, without loss of generality, we can assume that $1 \leq n$, $m \leq N$.

The destination station 130 adds the contribution of the $n^{th}$ station to the parity information from the $m^{th}$ station (modulo 256). This has the effect of repairing the exclusion of the data from the $n^{th}$ station from the parity information from the $m^{th}$ station.

With this repaired information, the destination station 130 can apply a known Berkelamp technique for decoding Reed-Solomon codes.

Space-Time Joint Cooperative Coding

Figure 3:
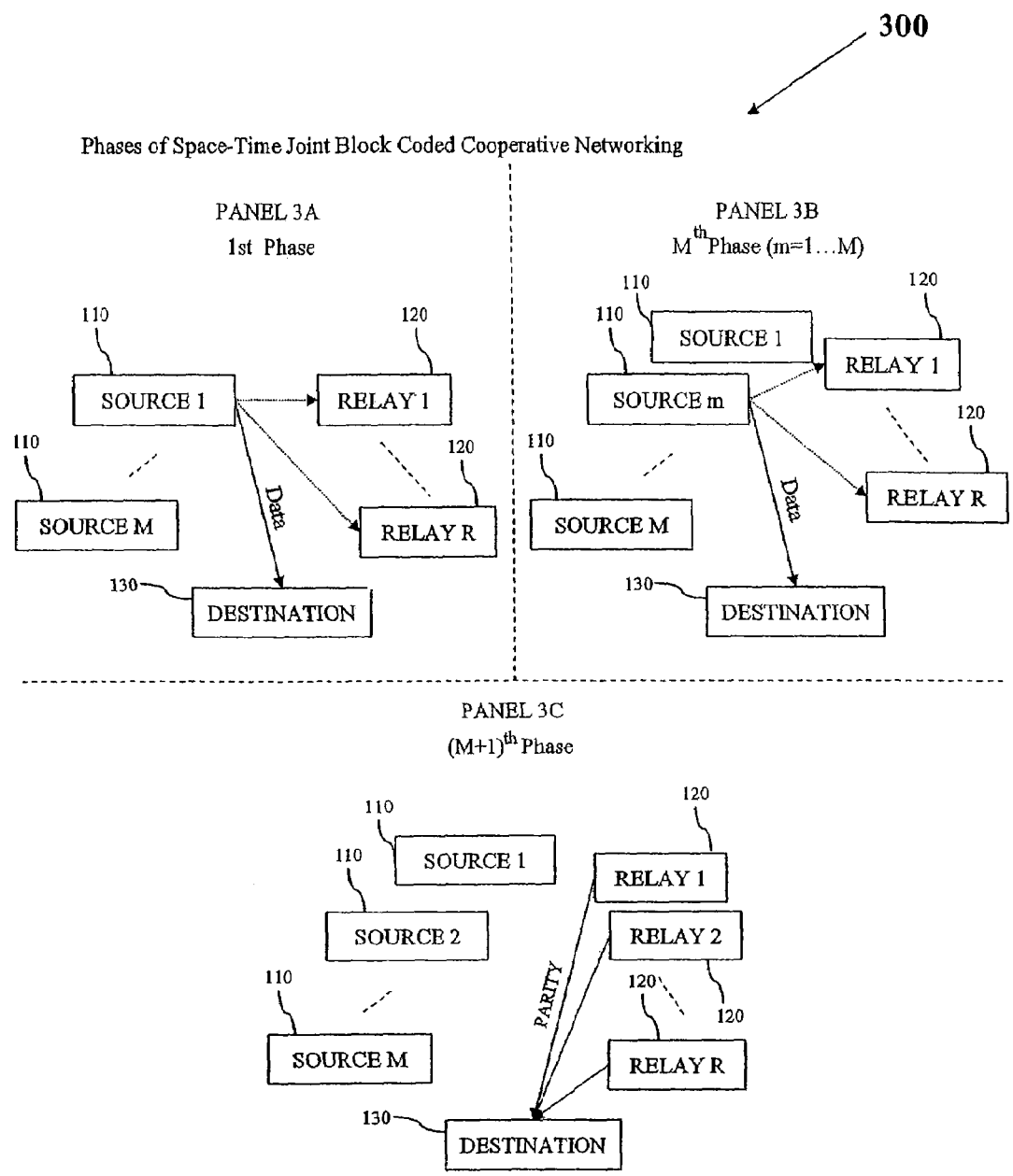
FIG. 3 (collectively including panels 3A, 3B, and 3C) shows a system including the use of Space-Time Joint Cooperative Coding.

FIG. 3 (collectively including panels 3A, 3B, and 3C) shows a system including the use of Space-Time Joint Cooperative Coding.

In an embodiment including space-time joint cooperative coding, the M source channels 110 broadcast their data signals to one or more destination stations 130, with the effect that each of the R cooperating stations 120 also receives those signals. This example of operation includes the following steps.

In panel 3A and 3B (phases 1 through M), the M source channels 110 broadcast their data signals to the one or more destination stations 130. For example, if there are M=4 source channels 110, each one of the M source channels 110 sends its entire data signal to its one or more intended destination stations 130.

During phases 1 through M, each of the R cooperating stations 120 receives each of the data signals. For example, if there are R=6 cooperating stations 120, each of the R cooperating stations 120 receives the data signals for each of the M source channels 110.

In a preferred embodiment, each of the R cooperating stations 120 computes the same joint protection code, jointly responsive to at least two of the data signals from the M source channels 110.

However, in alternative embodiments, some of the cooperating stations 120 might be assigned to compute joint protection codes for particular source channels 110, such as for example if it is desired to provide joint protection codes responsive to fewer source channels 110, or for example if it is desired to provide further joint protection codes responsive to a particular weak source channel 110.

In a first such example, in the event that there are M=4 source channels 110 and R=6 cooperating stations 120, each pair of source channels 110 might be assigned its own cooperating station 120.

In a second such example, in the event that there are M=4 source channels 110 and R=6 cooperating stations 120, but one of the source channels 110 $M_3$ is especially prone to weak signals, the R cooperating stations 120 might be asymmetrically assigned so as to provide additional protection to the signal from the source channel 110 $M_3$. This might also be performed adaptively in response to weakening or strengthening of particular source channels 110.

In panel 3C (phase M+1), each of the R cooperating stations 120 concurrently sends its computed joint protection code to the destination station 130. Concurrent operation of the R cooperating stations 120 preferably uses an orthogonal code design, such as the known Alamouti space-time code. This has the effect that the destination station 130 can compute the original data signals from data and parity information it receives.

In alternative embodiments, space-time cooperative coding might be performed with other techniques, such as for example CDMA coding, allowing signals to be sent substantially concurrently and decoded at the receiving station 130 without substantial error.

Dual-Source Joint Cooperative Coding

In the event that M=2 source channels 110, each source channel 110 might take on the role of being a cooperative station 120 for the other. This example of operation includes the following steps.

A first source channel 110 (herein called "station") broadcasts its data signal to the intended destination station 130. This has the effect that the second source channel 110, taking on the role of a cooperative station 120, also receives that data signal and decodes it.

The second source channel 110 broadcasts its data signal to the intended destination station 130. This has the effect that the first source channel 110, taking on the role of a cooperative station 120, also receives that data signal and decodes it.

Both the first and the second stations each evaluate the reliability of the data signal they each decoded. For each one, if the data signal received by a station is sufficiently reliable, that station computes a joint protective code in response to both the first and the second stations' data signals.

In one embodiment, the joint protective code includes a binary parity frame in which the $k^{th}$ bit of the frame equals the XOR of the $k^{th}$ bit of the first station's data signal and the $k^{th}$ bit of the second station's data signal.

Both stations simultaneously send the joint protective code, using the Alamouti space-time code. This has the effect that the destination station 130 is able to decode both the data signals and the joint protective code.

Adaptive Joint Cooperative Coding

Figure 4:
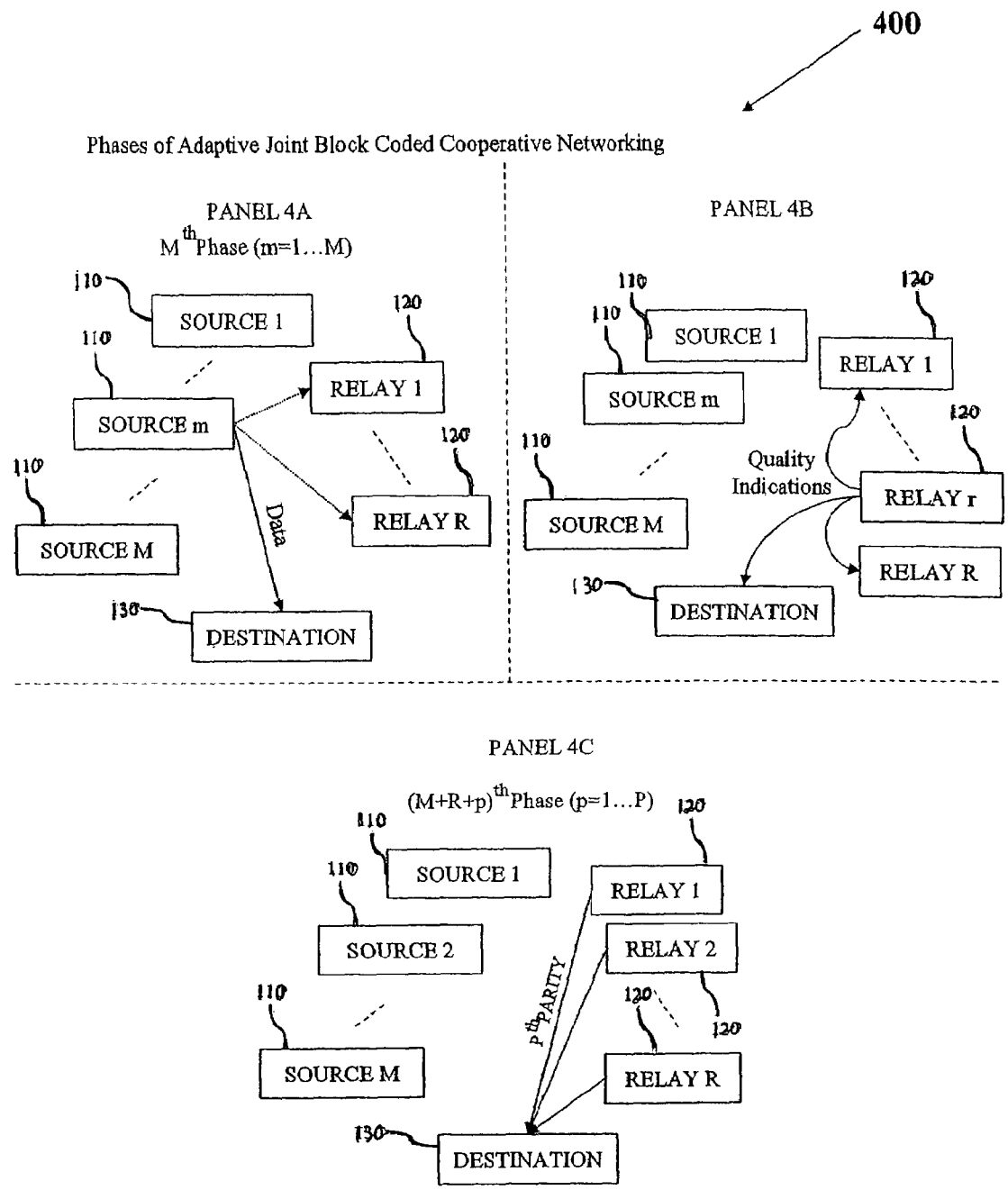
FIG. 4 (collectively including panels 4A, 4B, and 4C) shows a system including the use of Adaptive Joint Cooperative Coding.

FIG. 4 (collectively including panels 4A, 4B, and 4C) shows a system including the use of Adaptive Joint Cooperative Coding.

In this aspect, the methods, systems, and techniques shown herein are made responsive, adaptively, to possibly changing conditions in the network. This example of operation includes the following steps.

In panel 4A (phases 1 through M), each of the M source channels 110 broadcasts its data signal to the one or more destination stations 130. This has the effect that each of the R cooperating stations 120 can receive those data signals.

In panel 4B (phases M+1 through M+R), each of the R cooperating stations 120 broadcast an indication of data signal quality for each of the M source channels 110, each according to its own evaluation thereof.

In panel 4C (phases M+R+1 through M+R+P), each of the R cooperating stations 120 decodes the indications in the earlier step, and in response thereto, adapts its parameters for operating in the network.

In one embodiment, those parameters for operating in the network include at least one of the following.

One or more TDMA slots, or an adjustable length TDMA slot, in which each cooperating station 120 will use for sending its own computation of parity information. In one embodiment, one or more cooperating station 120 might decide not to send any parity information at all (for awhile), or might decide to send more than one packet of parity information.

Power levels for sending parity information.

FEC (forward error-correcting code) parameters, including at least one of: (a) which received data signals should be deemed reliable and thus coupled to the interleaf circuit, versus which data signals should be deemed unreliable and thus "erased", (b) structure of the interleaf process, such as for example its size and the permutation it implements, (c) number of parity symbols, nature of a block-code generating polynomial, and the like.

In one embodiment, each cooperating station 120 receives data signals and generates parity symbols in response thereto, using interleaving and block-coding similarly to the Joint Cooperative Coding methods, systems, and techniques described above. Moreover, in this embodiment, the parameters of the system, including the FEC, might be adaptively altered in response to changes in the network environment.

State-Coded Joint Cooperative Coding

Figure 5:
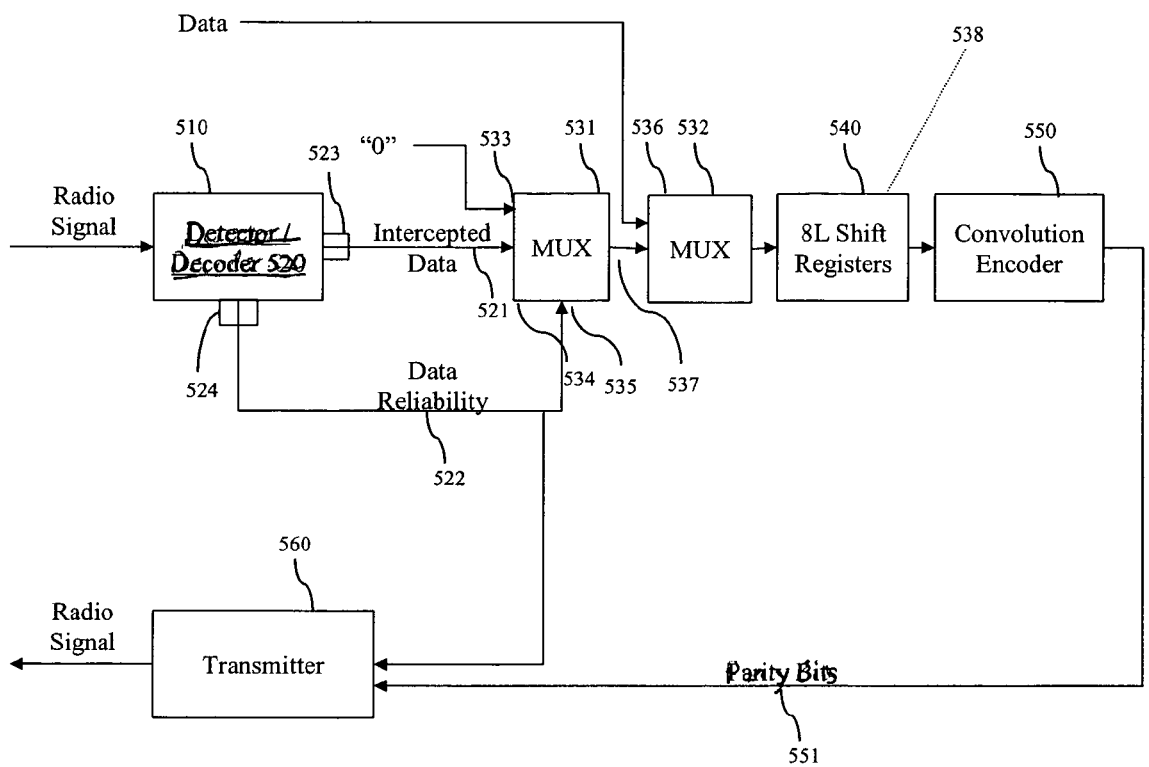
FIG. 5 shows a block diagram of a transmitter in a system including the use of Joint Block-Coded Cooperative Coding.

FIG. 5 shows a block diagram of a transmitter in a system including the use of State-Coded Joint Cooperative Coding.

After reading this application, those skilled in the art will recognize that the invention can be used in combination or conjunction with other and further types of protection code, not necessarily limited to block codes. For example, embodiments of the invention might be used in combination or conjunction with state-based error correaction codes (such as for example convolution codes, trellis codes, BICM, and signal codes).

In one embodiment, at least one source channel 110 uses a state-based error coding method, in which data to be sent by that source channel 110 is jointly encoded with signal data that it (taking on the role of a cooperating station 120) has received from other source channels 110.

A transmitter 500 includes elements as shown in FIG. 5, plus possibly other elements as described in the incorporated disclosure. These elements include at least an input port 510 disposed to receive a radio signal (such as for example, coupled to a receiving antenna), a detector/decoder 520, a decoded data bus 521 and a reliability signal bus 522 coupled to the detector/decoder 520, a first multiplexer 531 and a second multiplexer 532, a shift-register circuit 540, a convolution encoder 550, an encoded protection signal bus 551 coupled to an output of the convolution encoder 550, and an output port 560 disposed to send a radio signal (such as for example, coupled to a sending antenna).

The detector/decoder 520 is coupled to the input port 510, and includes elements as shown in FIG. 5, plus possibly other elements as described in the incorporated disclosure. These elements include at least a data detection circuit 523, disposed for determining the "best" value the relay 500 can determine for any particular data bit as it arrives, and at least a data reliability circuit 524, disposed for determining a measure of reliability of that data bit. In various embodiments, the data reliability circuit 522 might (a) examine a power level of the received signal, (b) estimate the SNR of the received signal, or (c) estimate a BER of the received signal.

The decoded data bus 521 is coupled to the data detection circuit 523 and the first multiplexer 531, as shown in FIG. 5, plus possibly other circuits as described in the incorporated disclosure. The first multiplexer 531 has a first data input 533 coupled to a logical "o" bit, a second data input 534 coupled to the decoded data bus 521, and a control input 535 coupled to the reliability signal bus 522. This has the effect that the multiplexer 530 will pass through any received data bits perceived as sufficiently reliable, while erasing (replacing with logical "o") any received data bits perceived as insufficiently reliable.

The reliability signal bus 522 is coupled to the data reliability circuit 524, to the second multiplexer 532, and to the output port 560, as shown in FIG. 5, Plus possibly other circuits as described in the incorporated disclosure. The second multiplexer 532 has a first data input 536 coupled to a data signal to be sent, a second data input 537 coupled to an output of the first multiplexer 532, and a control input 538 coupled to a synchronization circuit (not shown).

As the station is itself a source channel 110 in addition to taking on the role of a cooperating station 120, there is no particular requirement to test for signal reliability for signals originating at the source channel 110 itself. However, the station uses the second multiplexer 532 to interleave its own data signal with the joint protective code it computes and sends.

The shift-register circuit 540 is coupled to an output of the second multiplexer 532, as shown in FIG. 5, plus possibly other circuits as described in the incorporated disclosure. The shift-register circuit 540 interleaves data to be sent with joint protective codes to be sent, including at least the following steps.

Each incoming packet has L data bytes, that is, 8L data bits. In one embodiment, the shift-register circuit 540 includes 8L PCC's (punctured convolution coders), with the effect that each such coder corresponds to a selected bit-position in the 8L data bits.

Each incoming packet is decoded for both data and reliability information. Received data bits from the k most recent packets are coupled to 8L shift registers of k bits each, with the effect that each shift register corresponds to a data bit of the packet, itself L bytes. In the event that one of the k most recent packets was not successfully decoded, a logical "o" value is coupled to the shift register in its place.

A number v of encoded bits are generated for each data bit, by multiplying a vector of (k+1) bits, including data bits and bits in corresponding shift registers, by a v×(k+1) matrix over GF(2). These v bits are punctured according to PCC, with the effect of generating an average of w punctured encoded bits per data bit. The puncturing phases of the 8L encoders are synchronized, with the effect of maintaining the number of encoded bits per packet relatively constant.

The sending encoder 550 is coupled to an output of the interleaf circuit 540, as shown in FIG. 5, plus possibly other circuits as described in the incorporated disclosure. The sending encoder determines an encoded protection signal for output.

The encoded protection signal bus 551 is coupled to the output port 560, as shown in FIG. 5, plus possibly other circuits as described in the incorporated disclosure. The output port 560 is also coupled to the reliability signal bus 522 and receives an indicator whether the received data bits, from which the encoded protection signal was computed, were perceived as sufficiently reliable.

If reliable, the output port 560 sends a signal representative of the encoded protection signal, as delivered to it on the encoded protection signal bus 551. If not reliable, the output port 560 sends a signal with some of the data blocks or protection code blocks erased, that is, set to logical "o".

Each station sends its punctured encoded bits to the destination station 130, with the effect that they are concurrently received by the other stations.

In one embodiment, k or more bits are sent to indicate the signal quality (such as for example, fading levels) of the last k data packets.

The destination station 130 applies 8L soft Viterbi decoders to detect the 8L streams of convolutionally encoded data bits. These decoders take into account the signal quality the channels from a source to another source station (as reported within the packets themselves) and the fade amplitude of the signals from the source to the destination (soft decoding).

As described above with respect to the ability of the network to be adaptive, in some embodiments, the encoder might be designed to be adaptable to reported errors, both in the current transmitter 500, as well as those reported by earlier transmitters 500. For example, the encoder might dynamically change its code-generating matrix or its puncturing pattern, with the effect of compensating for data signal errors.

As described above with respect to alternative methods, systems, and techniques for coding, the transmitter 500 might be designed to use other and further coding schemes, such as for example BICM (bit interleaved coded modulation), TCM (trellis coded modulation), and other and further types of signal codes that have been optimized for fast-fading channels.

As described below, each packet might also include its own internal consistency check or internal error correction code. Moreover, the destination station 130 might also decode that internal error correction code iteratively to optimize the performance of a sender/receiver pair of stations.

Turbo-Coded Joint Cooperative Coding

In this aspect, the methods, systems, and techniques shown herein are performed in combination or conjunction with an internal FEC for each packet. In the context of the invention, there is no particular requirement that the FEC involves any particular form of code. For example, the FEC might include a block code, a convolution code, a BICM code, and the like. This code is herein sometimes called "internal", because it operates internally with the coder and decoder, rather than with cooperating stations 120.

The internal code can be utilized for error correction in the source-destination and in the source-relay channels, as well as for assessing interception quality. After the destination receives the parity signals from the relays it can decode the data packets using a soft iterative (herein also sometimes called "turbo") decoder, which iterates between the internal code and the code calculated by the cooperating stations 130.

Dual Wireless and Wire-Line Network

As described above, the methods, systems, and techniques shown herein are made responsive, adaptively, to possibly changing conditions in the wireless network in combination with a wire-line network. This example of operation includes the following steps.

A source channel 110 might be assisted adaptively by a cooperating station 120, in the event that the cooperating station 120 was able to provide to the source channel 110 at least one of: a power gain, a separate communication channel for data or for a protective code, a set of supplemental information regarding the wireless topology of the network, and the like.

A source channel 110 attempting to send data to a destination station 130 might be assisted adaptively by a cooperating station 120, in the event that the cooperating station 120 was able to provide to the source channel 110, or to the destination channel 130: a set of fading information, a set of reliability information, a separate communication channel for data or for a protective code, a set of supplemental information regarding the wireless topology of the network, and the like.

More generally, any first group of one or more stations might assist any second group of one or more stations by assisting wireless transmission or reception, using auxiliary information carried by a non-wireless (typically, wire-line) link. Some examples follow.

In the event that the destination station 130 includes a first cellular base station, and a cooperating station 120 includes a second cellular base station, the cooperating station 120 and the destination station 130 might cooperate using land-line communication to improve the quality and rate at which data signals are received and decoded by the destination station In the event that the destination station 130 includes a WAP (wireless access point), such as an 802.11 standard WAP, and the cooperating station 120 includes a second WAP, where both WAPs are coupled to a non-wireless network, such as a LAN (local area network), the cooperating station 120 and the destination station 130 might cooperate using LAN communication to improve the quality and rate at which data signals are received and decoded by the destination station 130.

In the event that the source channel 110 includes a WAP, and the cooperating station 120 includes a second WAP, where both WAPs are coupled to a non-wireless network, such as a LAN, the source channel 110 and the cooperating station 120 might cooperate using LAN communication to improve the quality and rate at which data signals are received and decoded by the destination station 130.

In the event that the source channel 110, the cooperating station 120, or the destination station 130, has access to a modem, the (relatively slower but still often useful) telephone system might be used to move auxiliary information among stations, with the effect of improving wireless communication.

It would be advantageous for wireless devices, such as for example WAPs, to attempt to "automatically" (that is, without user intervention) detect whether they have additional resources available, such as for example a power line, a LAN, another communication channel, and the like. Similarly, it would be advantageous for those wireless devices to attempt to "automatically" detect whether there are other wireless devices nearby, such as for example WAPs, with the effect of being able to actively assist those other wireless devices.

Figure 6:
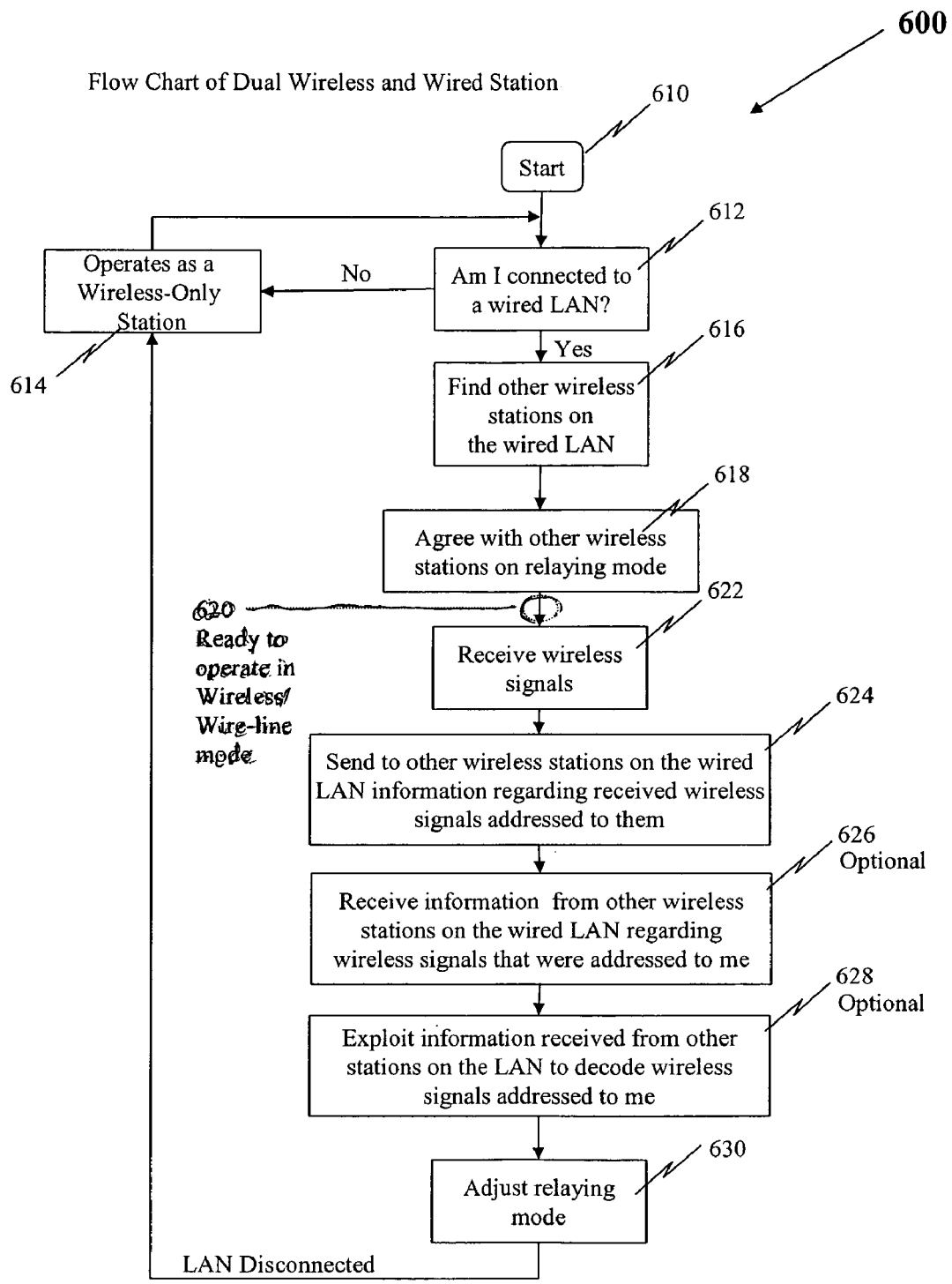
FIG. 6 shows a process flow diagram of a method of using a dual wireless and wired station in a system including the use of Joint Block-Coded Cooperative Coding.

FIG. 6 shows a process flow diagram of a method of using a dual wireless and wired station in a system including the use of Joint Block Coded Cooperative Networking.

A method 600 includes a flow point 610, at which the method starts.

At a step 612, the method determines if the wireless station is coupled to a wired LAN.

If not, control continues with a step 614, where the method 600 operates in wireless-only mode. From time to time, the method 600 continues to the step 612 to retest if the wireless station is coupled to a wired LAN.

If so, control continues with a step 616, where the method 600 searches for other wireless stations on the wired LAN.

At a step 618, the method 600 causes this device and any found devices to agree on a relaying mode.

At a flow point 620, the method is ready to operate in wireless/wire-line mode.

At a step 622, the method 600 receives wireless signals.

At a step 624, the method 600 sends information to other wireless stations on the wired LAN, with respect to wireless communication directed to them.

At a step 626, the method 600 receives similar information, as in the step 624, from other wireless stations on the wired LAN.

At a step 628, the method 600 uses information it received to decode wireless signals.

At a step 630, the method 600 uses information it received to optimize communication with other wireless stations on the wired LAN.

If the wireless station continues to be connected to the wired LAN, control continues with the flow point 620.

If the wireless station has lost its connection to the wired LAN, control continues with the step 614, where the method operates in wireless-only mode, as noted above.

ALTERNATIVE EMBODIMENTS

Although preferred embodiments are disclosed herein, many variations are possible which remain within the concept, scope, and spirit of the invention. These variations would become clear to those skilled in the art after perusal of this application.

After reading this application, those skilled in the art will recognize that these alternative embodiments and variations are illustrative and are intended to be in no way limiting. After reading this application, those skilled in the art would recognize that the techniques described herein provide an enabling technology, with the effect that heretofore advantageous features can be provided that heretofore were substantially infeasible.

TECHNICAL APPENDIX

The set of inventive techniques are further described in the Technical Appendix. After reading this application and its Technical Appendix, those skilled in the art would recognize how to make and use the invention. All reasonable generalizations of techniques shown in this application and its Technical Appendix are within the scope and spirit of the invention, and would be workable, without further invention or undue experimentation.

At least the following documents are part of the technical appendix.

U.S. Provisional Patent Application No. 60/502,918, filed Sep. 11, 2003, in the name of the same inventor, titled "Jointly Coded Cooperative Networking".

O. Shalvi, *Multiple Source Cooperation Diversity*, to appear, IEEE Communications Letters.

O. Shalvi, Matlab code, in Technical Appendix (enclosed).

The Technical Appendix is submitted with this application and hereby made a part of this application. The Technical Appendix, and all references cited therein, are hereby incorporated by reference as if fully set forth herein.

This Technical Appendix is intended to be explanatory and illustrative only, and not to limit the invention in any way, even if few (or only one) embodiment is shown.

The invention claimed is:

1. A method, including steps of
generating a set of multiple distinct signals;
generating a joint protection signal, jointly in response to at least two of said multiple distinct signals;
receiving said set of multiple distinct signals at a device other than one performing said steps of generating;
receiving said joint protection signal at a device other than one performing said steps of generating said signals; and
decoding said set of multiple distinct signals in response to said multiple distinct signals and in response to said joint protection signal.

2. A method as in claim 1, wherein said joint protection signal includes an error correcting code.

3. A method as in claim 1, including steps of
receiving a set of multiple distinct signals at a second device;
generating a second joint protection signal, jointly in response to at least two of those multiple distinct signals; and
sending that second joint protection signal, wherein it can be received at a device other than one performing steps of generating.

4. A method as in claim 3, including steps of
receiving that set of multiple distinct signals at a device other than any one performing said steps of generating;
receiving said joint protection signal and said second joint protection signal; and
decoding said set of multiple distinct signals in response to said multiple distinct signals, in response to said joint protection signal, and in response to said second joint protection signal.

5. A method as in claim 3, wherein said joint protection signals include at least one of (a) at least two distinct error correcting codes, (b) at least two substantially distinct protection signals, (c) at least one error correcting code.

6. A method, including steps of
receiving a first set of multiple distinct signals;
generating a first joint protection signal, jointly in response to at least two of said first set of multiple distinct signals; and
receiving at least one second signal;
generating a second joint protection signal, jointly in response to at least two of: (a) at least one of said first set of multiple distinct signals, (b) said first joint protection signal, (c) said at least one second signal; and
sending said second joint protection signal, wherein it can be received at a device other than one performing said steps of generating.

7. A method as in claim 6, including steps of
receiving said first set of multiple distinct signals and said at least one second signal, at a device other than one performing said steps of generating;
receiving at least one of said first joint protection signal and said second joint protection signal, at a device other than one performing said steps of generating; and
decoding at least said first set of multiple distinct signals in response to said first set of multiple distinct signals, and in response to at least one of said first joint protection signal and said second joint protection signal.

8. A method as in claim 6, including steps of
receiving said set of multiple distinct signals at a device other than any one performing said steps of generating;
receiving said joint protection signal and said second joint protection signal; and
decoding that set of multiple distinct signals in response to said multiple distinct signals, in response to said joint protection signal, and in response to said second joint protection signal.

9. A method as in claim 6, wherein said joint protection signals include at least one of (a) at least two distinct error correcting codes, (b) at least two substantially distinct protection signals, (c) at least one error correcting code.

10. A method, including steps of
sending a set of multiple distinct signals from a set of source devices;
receiving at least a subset of said set of multiple distinct signals at substantially each one of a set of cooperating devices;
generating a set of joint protection signals at substantially each one of said set of cooperating devices, wherein each such joint protection signal is in response to at least two of those multiple distinct signals;
sending said set of joint protection signals;
receiving said joint protection signals; and
decoding said multiple distinct signals can be decoded in response to said multiple distinct signals and in response to said joint protection signals.

11. A method as in claim 10, wherein
said joint protection signals include an error-correcting block code; and
said steps of decoding include (a) steps of decoding data and parity values of signals sent by the multiple sources, (b) computing the error-correcting block code in response to said data and parity values, and (c) each cooperative station sends a differing portion of the computed error-correcting block code.

12. A method as in claim 10, wherein said joint protection signals include at least one of (a) at least two distinct error correcting codes, (b) at least two substantially distinct protection signals, (c) at least one error correcting code.

13. A system including
a plurality of signal sources;
a cooperating station, including (a) a receiver disposed for receiving distinct signals from each of that plurality of signal sources, (b) a generator of a joint protection signal, coupled to that receiver, jointly in response to at least two of those multiple distinct signals, (c) a transmitter coupled to that receiver and that generator; and
a receiving station, including (a) a receiver disposed for receiving distinct signals from each of that plurality of signal sources, (b) a decoder, coupled to that receiver, responsive to that plurality of signal sources and to that joint protection signal.

14. A system as in claim 13, wherein that joint protection signal includes an error correcting code.

15. A system as in claim 13, including
a second cooperating system, including (a) a second receiver disposed for receiving distinct signals from each of that plurality of signal sources, (b) a second generator, coupled to the second receiver, of a second joint protection signal, jointly in response to at least two of those multiple distinct signals, and (b) a second transmitter coupled to that second receiver and that second generator;
wherein that decoder is responsive to that plurality of signal sources and to both that joint protection signal and that second joint protection signal.

16. A system as in claim 15, wherein those joint protection signals include at least one of (a) at least two distinct error correcting codes, (b) at least two substantially distinct protection signals, (c) at least one error correcting code.

17. Apparatus including
a first memory maintaining a set of multiple distinct signals, each received from a distinct source;
a computing device coupled to that memory;
a second memory maintaining a joint protection signal, coupled to that computing device, wherein that joint protection signal is jointly responsive to at least two of those multiple distinct signals; and
a transmitter coupled to that second memory.

18. Apparatus as in claim 17, including
a receiver maintaining that set of multiple distinct signals, as received from its original source, and maintaining that joint protection signal;
a decoder coupled to that receiver;
memory maintaining a decoded set of those multiple distinct signals in response to receipt of those multiple distinct signals and in response to receipt of that joint protection signal.

19. Apparatus as in claim 17, wherein those joint protection signals include at least one of (a) at least two distinct error correcting codes, (b) at least two substantially distinct protection signals, (c) at least one error correcting code.

* * * * *